US008050698B2

(12) United States Patent
Seligmann et al.

(10) Patent No.: US 8,050,698 B2
(45) Date of Patent: Nov. 1, 2011

(54) PEER-TO-PEER NEIGHBOR DETECTION FOR PROXIMITY-BASED COMMAND EXECUTION

(75) Inventors: Doree Duncan Seligmann, New York, NY (US); Michael J. Sammon, Watchung, NJ (US); Lynne Shapiro Brotman, Westfield, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1833 days.

(21) Appl. No.: 10/891,804

(22) Filed: Jul. 15, 2004

(65) Prior Publication Data

US 2006/0030263 A1 Feb. 9, 2006

(51) Int. Cl.
*H04B 7/00* (2006.01)
(52) U.S. Cl. ........ 455/517; 455/410; 455/411; 455/41.2
(58) Field of Classification Search ................... 455/517, 455/41.2, 410, 411; 340/5.81, 5.8, 539.12; 726/2, 3, 5, 7, 27–29, 31
See application file for complete search history.

(56) References Cited

U.S. PATENT DOCUMENTS

| 6,189,105 | B1 | 2/2001 | Lopes | |
| 6,657,538 | B1 * | 12/2003 | Ritter | 340/5.81 |
| 6,697,649 | B1 * | 2/2004 | Bennett et al. | 455/574 |
| 6,757,722 | B2 | 6/2004 | Lonnfors et al. | |
| 6,778,820 | B2 | 8/2004 | Tendler | |
| 6,798,358 | B2 | 9/2004 | Joyce et al. | |
| 7,002,468 | B2 * | 2/2006 | Eveland et al. | 340/539.12 |
| 2002/0186121 | A1 * | 12/2002 | Yoshikawa et al. | 340/5.28 |
| 2004/0003133 | A1 * | 1/2004 | Pradhan et al. | 709/318 |
| 2005/0266798 | A1 * | 12/2005 | Moloney et al. | 455/41.2 |

FOREIGN PATENT DOCUMENTS

| EP | 1521489 A1 | 4/2005 |
| WO | WO 02/093501 A1 | 11/2002 |
| WO | WO 03/079578 A1 | 9/2003 |
| WO | WO 04/002113 A1 | 12/2003 |

OTHER PUBLICATIONS

Bluetooth Specification version 1.0B, pp. 41-42, Dec. 1, 1999.*
"Japanese Patent Application 2005-206402 Office Action" Jan. 28, 2008.
T. Nakagi, "Japanese Patent Application No. 2005-206402 Office Action", Sep. 30, 2008, Publisher: JPO, Published in: JP.
Mikhailova, Elena, "CA Application No. 2,511,700 Office Action Sep. 22, 2009", , Publisher: CIPO, Published in: CA.

* cited by examiner

*Primary Examiner* — Fayyaz Alam

(57) ABSTRACT

An apparatus and methods are disclosed for enabling the response to a command at a personal wireless terminal to be based at least partially on the presence or absence of other users nearby, and possibly the identity of those users. In the illustrated embodiment, the personal wireless terminal determines wirelessly (e.g., via Bluetooth, etc.) whether there are any other nearby personal wireless terminals (and inferentially, the users associated with these terminals), and then determines whether the command is authorized in that particular environment of nearby users. In some embodiments, authorization is also at least partially based on one or more additional factors, such as the identity of the user of the personal wireless terminal, the identify of nearby users, the nature of the command, one or more arguments of a command, the value of a datum retrieved by a query, and the date and time (i.e., "calendrical time").

11 Claims, 7 Drawing Sheets

| User | Command | Neighbor | Condition | Output |
|---|---|---|---|---|
| grchen | store diagnosis | doctor | | |
| grchen | read diagnosis | 0 | | |
| nurse | read diagnosis | non-superior | | suppress time-to-live |
| nurse | read biopsy result | non-superior | | K4x encoding |
| grchen | read biopsy result | 0 | | |
| grchen | read biopsy result | superior | superior is authorized | |
| tbsmith | change vault password | 2 | rule2 | |
| ⋮ | | | | |
| any | read balance | 0 | rule1 | |

PEER-TO-PEER NEIGHBOR DETECTION FOR PROXIMITY-BASED COMMAND EXECUTION

FIELD OF THE INVENTION

The present invention relates to telecommunications in general, and, more particularly, to techniques for intelligently responding to a command issued by the user of a wireless terminal.

BACKGROUND OF THE INVENTION

Bluetooth is an open standard specification for radio frequency-based, short-range connectivity. Bluetooth is designed to be an inexpensive, wireless networking system for a variety of devices (i.e., "terminals") such as mobile telephones, keyboards, mice, displays, etc. Bluetooth terminals that are within transmission range of one another (typically, 10 meters) form small ad-hoc networks called piconets and networks of multiple piconets called scatternets.

FIG. 1 depicts wireless telecommunications system 100 which communicates via Bluetooth. Wireless telecommunications system 100 is a Bluetooth piconet that comprises five terminals: Bluetooth-enabled personal wireless terminal 102-1 (e.g., a mobile telephone, a personal digital assistant [PDA], etc.) carried by user 101-1, Bluetooth-enabled personal wireless terminal 102-2 carried by user 101-2, Bluetooth-enabled computer keyboard 103, Bluetooth-enabled computer mouse 104, and Bluetooth-enabled desktop computer 105.

Users 101-1 and 101-2 can move about and can enter commands into personal wireless terminals 102-1 and 102-2, respectively, via one or more input mechanisms (e.g., keypad input, pen-based input, voice input, etc.). Personal wireless terminals 102-1 and 102-2 also typically have one or more output transducers (e.g., liquid-crystal display, speaker, etc.) to present content (e.g., a web page, an audio clip, output of an executed query, etc.) to users 101-1 and 101-2, respectively.

Examples of commands for personal wireless terminals 102-1 and 102-2 include: adjusting speaker volume; editing information in a spreadsheet; entering a move in a Chess game; starting a sound clip; capturing an image with a digital camera embedded in the wireless terminal; capturing an acoustic signal with a microphone embedded in the wireless terminal; downloading a web page; issuing a query that searches a database stored on a server; sending an email message; and placing a telephone call.

Some computing devices such as wireless terminals, desktop personal computers (PCs), and servers require a user to log in to the device before allowing the user to use the device. For example, when a personal computer (PC) that runs on the Windows XP or Linux operating system is powered on, the user is confronted with a log-in screen that asks for the user's username (also referred to as a screen name for Internet service providers such as AOL) and password. The user is can not proceed past the start-up screen until he or she provides a valid username and password combination.

Some computing devices provide, in addition to a log-in screen, one or more authorization mechanisms to restrict access to data, commands, or both. For example, PCs that run on the Windows XP or Linux operating system enable a data file to be associated with a particular user or group of users, thereby allowing only the associated user(s) to access the data file. In some authorization mechanisms, separate read- and write-permissions can be associated with a data file, thereby partitioning users into four categories: (i) those who can read and write to the data file, (ii) those who can read the data file but cannot write to it, (iii) those who can write to the data file but cannot read it, and (iv) those who can neither read nor write to the data file. Furthermore, some authorization mechanisms enable a command (such as an executable file) to be associated with a particular user or group of users, thereby allowing only the associated user(s) to execute the command.

The mechanism for restricting who can read, write, and execute a file is a great advantage in many practical situations, but it does not provide the flexibility and appropriateness necessary for many other situations. Therefore, the need exists for innovative restriction mechanisms.

SUMMARY OF THE INVENTION

In many situations, it would be advantageous if the execution of commands (e.g., files, etc.) and the reading and writing of files could be restricted not just on the identity of the user who is attempting it, but also on whether or not there are other people in the vicinity of that user. For example, it might be advantageous to prevent a hospital secretary from reading a patient's file unless the secretary is in the presence of either the patient or the patient's doctor, and it might be advantageous to prevent the secretary from writing into the patient's file unless the secretary is in the presence of either the patient's doctor or nurse.

As another example, it might be advantageous to prevent a bank employee from changing the password file for a vault unless: (i) the employee is in the presence of at least two other employees, and (ii) it is during normal business hours.

As yet another example, it might be advantageous to prevent a bank manager from reading payroll information on his or her personal wireless terminal when there are other people nearby. As yet another example, when a teller deposits a check into a depositor's account, it might be desirable to display the new balance only when there are no other people nearby, and instead display "Deposit confirmed" when there are people nearby. Alternatively, instead of the "Deposit confirmed" message, an encoded version of the balance might be displayed that enables only the teller to know the new balance.

It might be advantageous to provide a user who is accessing content (e.g., a news article, a web page, etc.) via his or her personal wireless terminal as text when people are nearby (e.g., within hearing range, etc.) but acoustically when there are not. This prevents people who are near from (i) overhearing the content, and (ii) being disturbed by noise.

As another example, some military data might have both classified and unclassified versions. In this case it might be advantageous to provide an authorized user the classified version when no other people are nearby and the unclassified version when other people are nearby.

The present invention enables the response to a user's command at a personal wireless terminal to be based on the presence or absence of other people near the personal wireless terminal. The absence or presence of other people is inferred from the absence or presence of personal wireless terminals associated with those people. In some embodiments of the present invention, the response to the user's command is also based on the identity of the people nearby.

In accordance with the illustrated embodiment, a personal wireless terminal that receives a command from its user determines whether there are any other nearby personal wireless terminals (and inferentially, the users associated with these terminals), and then determines whether the command is authorized in that environment of nearby users. For example, it might be desirable to restrict a nurse's wireless access, via her personal wireless terminal, to certain data in a patient's record unless the patient's doctor is within 10 feet of her.

In accordance with the illustrative embodiment, a personal wireless terminal T, upon receiving a command from its user, first identifies the personal wireless terminals in T's Bluetooth network (i.e., piconet or scatternet) that are associated with a user other than the user of T. For example, if T's Bluetooth network includes a Bluetooth-enabled computer mouse, which is a type of wireless terminal that is not a personal wireless terminal, then the presence of the computer mouse would not cause personal wireless terminal T to conclude that another user is nearby. Similarly, a second Bluetooth-enabled personal wireless terminal that also belongs to the user of T would not cause personal wireless terminal T to conclude that another user is nearby. (The user might have entered the command into his or her Bluetooth-enabled PDA while carrying a Bluetooth-enabled telephone in his or her pocket.)

In accordance with the illustrative embodiment, personal wireless terminal T then determines what other Bluetooth-enabled personal wireless terminals, outside T's Bluetooth network, are nearby. In other words, personal wireless terminal T determines (e.g., by listening to the shared-communications channel, by broadcasting a message that requests an acknowledgement, etc.) what other Bluetooth-enabled personal wireless terminals are currently capable of communicating with T. Because of the short transmission range of Bluetooth (approximately 10 meters), any detected transmissions or received acknowledgements are necessarily from nearby wireless terminals.

In accordance with the illustrative embodiment, personal wireless terminal T subsequently determines whether the entered command can be executed based on the presence or absence of the users in its vicinity. In some embodiments of the present invention, the response to the command is also at least partially based on one or more additional factors, such as: (i) the identity of the user of personal wireless terminal T, (ii) the identity of the nearby users, (iii) the nature of the command (e.g., a query, a command to store data, a command to place a call, a command to transmit data, etc.), (iv) one or more arguments of the command (e.g., a filename, a command option, etc.), (v) the value of a datum retrieved by a query, (vi) the date and time [i.e., "calendrical time"], etc.

In some embodiments of the present invention, when the personal wireless terminal executes an authorized command and execution results in one or more outputs (e.g., a result value, etc.), the personal wireless terminal also determines whether to suppress or encode one or more of these outputs based on the presence or absence of nearby users, and in some cases on the additional factors as described above. In those embodiments, the personal wireless terminal accordingly outputs unsuppressed outputs (both unchanged and encoded) to the user (e.g., visually, acoustically, etc.).

The present invention might be desirable in a variety of scenarios. For example, in a hospital it might be desirable to restrict a technician's access, via his or her personal wireless terminal, to certain data in a patient's record unless the patient's doctor is nearby.

At a bank, it might be desirable if an employee could only enter a command to change a vault electronic password (i) in the presence of at least two other employees, and (ii) between the hours of 7:00 pm and 8:00 pm Monday through Saturday. Similarly, the bank branch manager might have to be nearby when a bank employee enters a command to transfer assets exceeding $50,000 from one account to another. As another example, the bank branch manager might only be able to view payroll information on his or her telecommunications terminal when there are no other users nearby. As yet another example, when a teller deposits a check into a depositor's account, it might be desirable to display the new balance only when there are no other users nearby, and instead display "Deposit confirmed" when there are users nearby. Alternatively, instead of the "Deposit confirmed" message, an encoded version of the balance might be displayed that enables only the teller to know the new balance.

As another example, it might be desirable if a user accessing content (e.g., a news article, a web page, etc.) via his or her mobile terminal might automatically receive such content as synthesized speech when there are no other users nearby, and as displayed text otherwise.

As yet another example, some military data (e.g., maximum speed of a Tomahawk missile, maximum range of a Harpoon missile, etc.) have both classified and unclassified versions. When a user issues a request to access such a datum via his or her mobile terminal, therefore, it might be desirable to automatically return the classified version only when (i) there are no other users nearby, or (ii) all nearby users have a Secret clearance; otherwise, the unclassified version would be returned.

Although the illustrative embodiment of the present invention is disclosed in the context of Bluetooth personal wireless terminals, it will be clear to those skilled in the art, after reading this specification, how to make and use embodiments of the present invention that use other kinds of personal wireless terminals and other network protocols (e.g., the Wireless Universal Serial Bus standard that is currently in development, ultra wideband [UWB], etc.).

The illustrative embodiment comprises: (a) receiving a command at a first personal wireless terminal; and (b) refusing to execute the command when there are k other personal wireless terminals in the same wireless network as the first personal wireless terminal; wherein k is a positive integer.

DETAILED DESCRIPTION

The terms appearing below are given the following definitions for use in this Description and the appended Claims.

For the purposes of the specification and claims, the term "wireless terminal" is defined as a device that can communicate wirelessly with other devices in a network (e.g., a personal digital assistant, a mobile telephone, a printer, a computer mouse, a computer keyboard, etc.), and the term "personal wireless terminal" is defined as a wireless terminal that a user uses to communicate with another user (e.g., a personal digital assistant, a mobile telephone, etc.). Communication between users of wireless terminals can be via voice, email, instant messaging, etc.

For the purposes of the specification and claims, the term "calendrical time" is defined as indicative of one or more of the following:

(i) a time (e.g., 16:23:58, etc.), (ii) one or more temporal designations (e.g., Tuesday, November, etc.), (iii) one or more events (e.g., Thanksgiving, John's birthday, etc.), and (iv) a time span (e.g., 8:00 PM to 9:00 PM, etc.).

Figure 1:
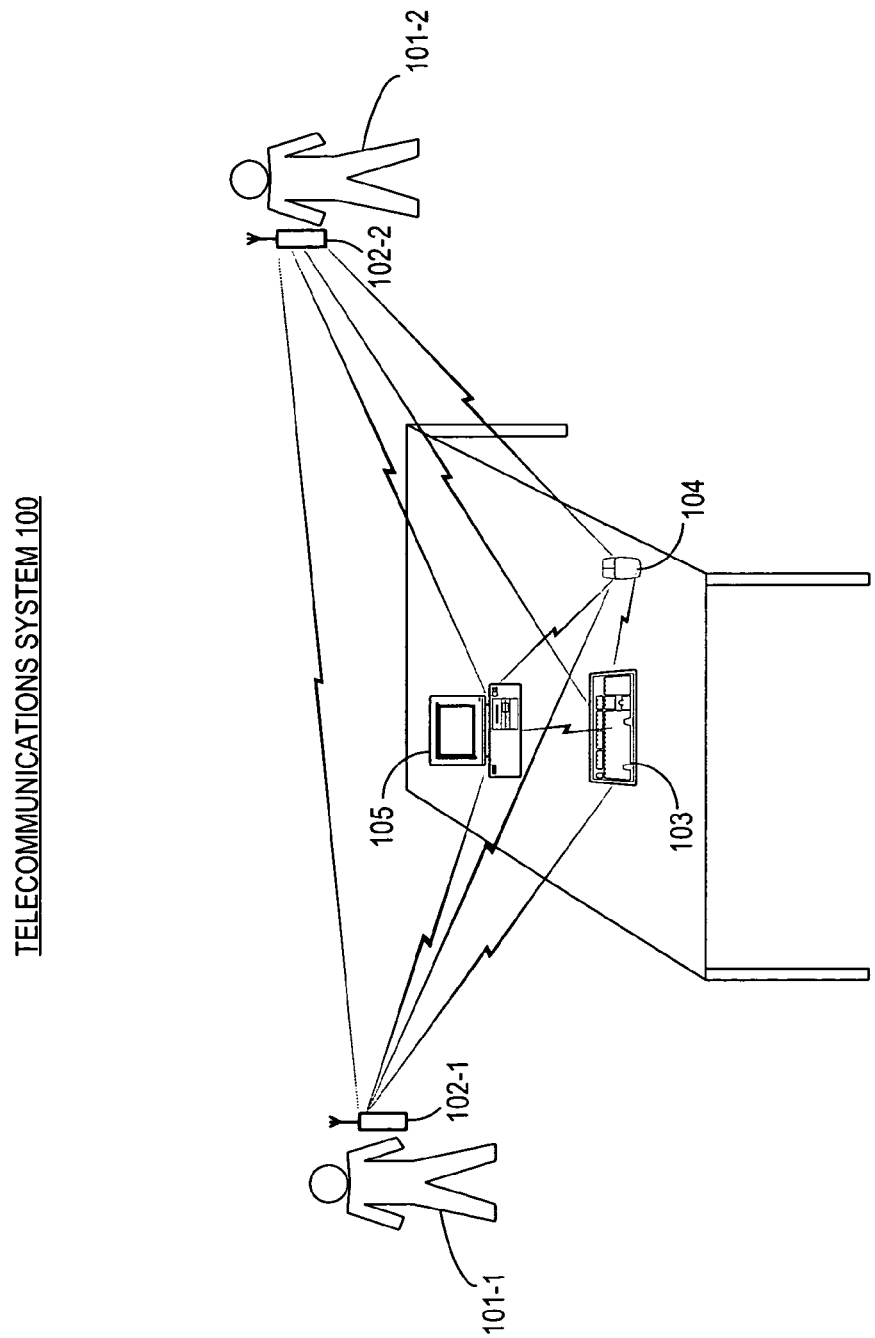
FIG. 1 depicts a wireless telecommunications system in the prior art.
Figure 2:
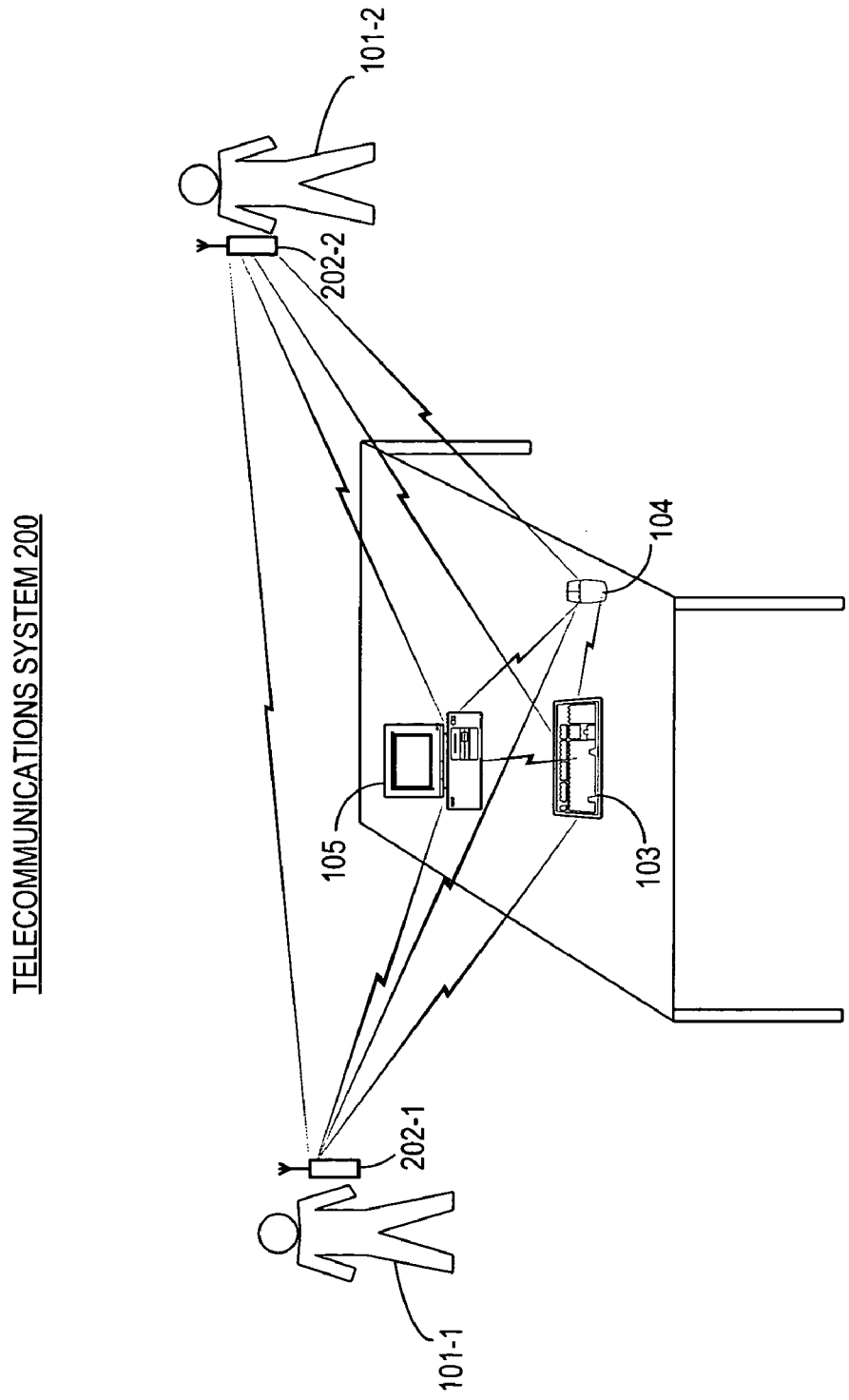
FIG. 2 depicts a wireless telecommunications system in accordance with the illustrative embodiment of the present invention.

FIG. 2 depicts wireless telecommunications system 200 in accordance with the illustrative embodiment of the present invention. As shown in FIG. 2, wireless telecommunications system 200 is a Bluetooth piconet comprising five wireless terminals: Bluetooth-enabled personal wireless terminal 202-1 carried by user 101-1, Bluetooth-enabled personal wireless terminal 202-2 carried by user 101-2, Bluetooth-enabled computer keyboard 103, Bluetooth-enabled computer mouse 104, and Bluetooth-enabled desktop computer 105.

Personal wireless terminals 202-1 and 202-2 are capable of receiving commands from users 101-1 and 101-2, respectively, of communicating with other terminals via Bluetooth (and perhaps, via other wireless protocols), and of performing the methods described below and with respect to FIGS. 6 and 7. Bluetooth-enabled wireless computer keyboard 103, Bluetooth-enabled computer mouse 104, and Bluetooth-enabled desktop computer 105 are the same as in wireless telecommunications system 100.

Figure 3:
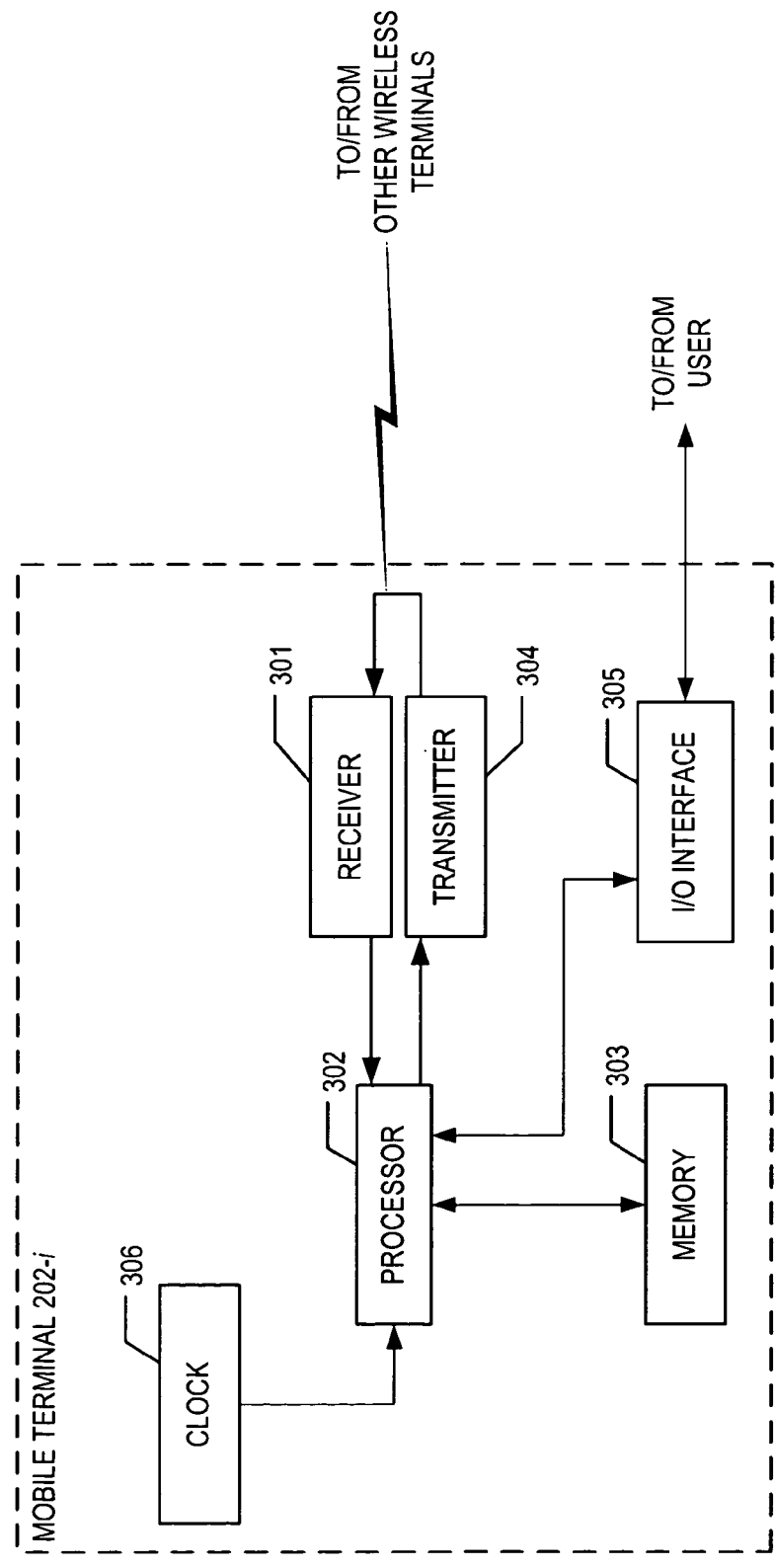
FIG. 3 depicts a block diagram of the salient components of personal wireless terminal 202-$i$, as shown in FIG. 2, in accordance with the illustrative embodiment of the present invention.

FIG. 3 depicts a block diagram of the salient components of personal wireless terminal 202-$i$, in accordance with the illustrative embodiment of the present invention. As shown in FIG. 3, personal wireless terminal 202-$i$ comprises receiver 301, processor 302, memory 303, transmitter 304, input/output interface 305, and clock 306, interconnected as shown.

Receiver 301 receives signals from other wireless terminals and forwards the information encoded in these signals to processor 302, in well-known fashion. It will be clear to those skilled in the art, after reading this disclosure, how to make and use receiver 301.

Processor 302 is a general-purpose processor that is capable of executing instructions stored in memory 303, of reading data from and writing data into memory 303, of receiving information from receiver 301, of transferring information to transmitter 304, and of executing the tasks described below and with respect to FIGS. 6 and 7. In some alternative embodiments of the present invention, processor 302 might be a special-purpose processor. In either case, it will be clear to those skilled in the art, after reading this disclosure, how to make and use processor 302.

Memory 303 is capable of storing (i) executable instructions and (ii) data, including some or all of tables 401, 502, and 503 described below and with respect to FIGS. 4 and 5. As will be appreciated by those skilled in the art, memory 303 might be any combination of random-access memory (RAM), flash memory, disk drive, etc., and it will be clear to those skilled in the art, after reading this disclosure, how to make and use memory 303.

Transmitter 304 receives information from processor 302 and wirelessly transmits signals that encode this information to other wireless terminals, in well-known fashion. It will be clear to those skilled in the art, after reading this disclosure, how to make and use transmitter 304.

Input/output interface 305 (i) receives input signals from the user of personal wireless terminal 202-$i$ and forwards corresponding signals to processor 302, and (ii) receives signals from processor 302 and emits corresponding output signals that can be sensed by the user, in well-known fashion. As will be appreciated by those skilled in the art, the input mechanism of input/output interface 305 might be a keypad, touchscreen, microphone, etc., and the output mechanism of input/output interface 305 might be a liquid-crystal display (LCD), speaker, etc.

Clock 306 transmits the current time, date, and day of the week to processor 302 in well-known fashion.

Figure 4:
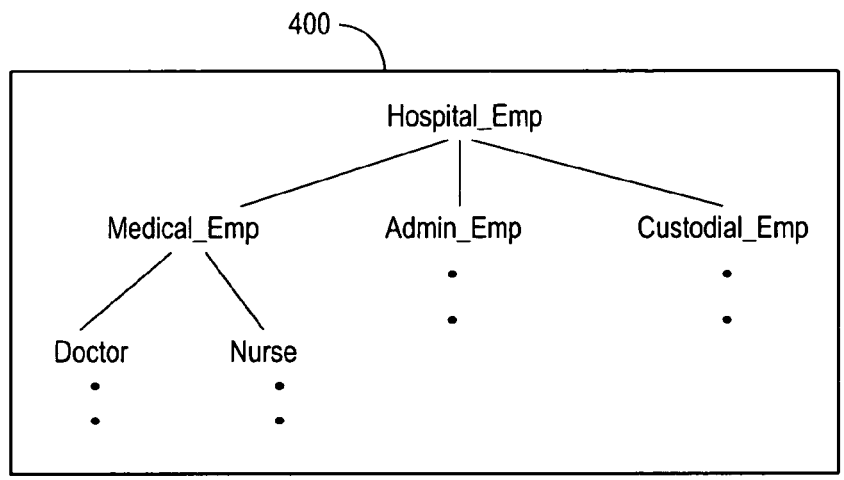
FIG. 4 depicts a tree and a table for an exemplary organization of authorization information, in accordance with the illustrative embodiment of the present invention.

FIG. 4 depicts a tree and a table for an exemplary organization of authorization information in accordance with the illustrative embodiment of the present invention.

User group hierarchy 400 is a tree representing relations between user groups (e.g., doctors, nurses, etc.). When a first user group is an ancestor of a second user group, users from the first group have a higher rank than users from the second group (i.e., users from the first group are "superior" to users of the second group.)

Command authorization table 401 contains a "whitelist" of authorized commands for various combinations of users and nearby users (i.e., "neighbors"). If a particular combination is not in command authorization table 401, then that combination is not authorized. (As will be appreciated by those skilled in the art, in some embodiments it might be advantageous to instead use a "blacklist" that enumerates the unauthorized combinations in command authorization table 401.) Command authorization table 401 also indicates, when appropriate, whether any particular outputs of the command should be suppressed or encoded, as described above.

As shown in FIG. 4, an entry for field "user" can be an individual user identifier, a user group (e.g., nurse, etc.), or "any", which applies to all users. An entry for field "neighbor" can be: (i) a non-negative integer, indicating the number of neighbors that must be present for the command to be authorized; (ii) a user group (e.g., doctor, etc.); or (iii) a relation between the ranks of the user and a neighbor (e.g., superior, non-superior, same, inferior, non-inferior, etc.)

An entry of command authorization table 401 might have a necessary condition for authorization in the field entitled "condition." The condition can be any logical expression that evaluates to true or false. In some embodiments, the entry in the "condition" field might be an identifier that corresponds to a rule in rule list 503, as is described below and with respect to FIG. 5.

A particularly useful condition in some authorization schemes is to allow a user to execute a command if his or her neighbor is authorized to execute that command. For example, the sixth row of table 401 indicates that Gary R. Chen (user identifier grchen) is authorized to read a biopsy result if one of his superiors is nearby, and the superior is authorized to read a biopsy result (i.e., Chen "inherits" the authorization from his superior). As will be appreciated by those skilled in the art, determining whether the superior is authorized to read a biopsy result might require another "recursive" lookup of table 401.

Figure 5:
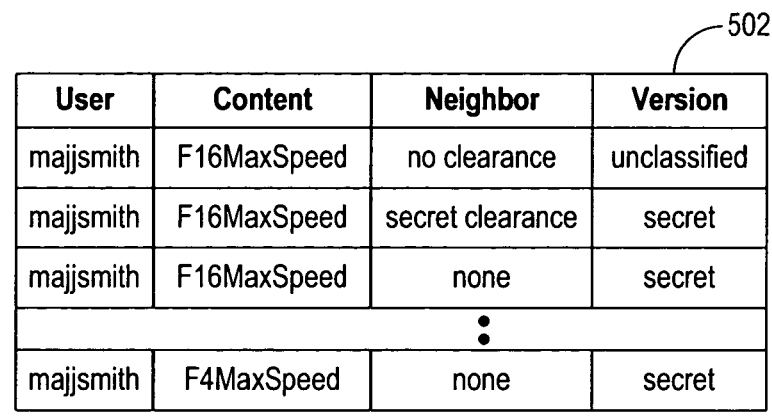
FIG. 5 depicts two additional tables for the exemplary organization of authorization information, in accordance with the illustrative embodiment of the present invention.
Figure 5:
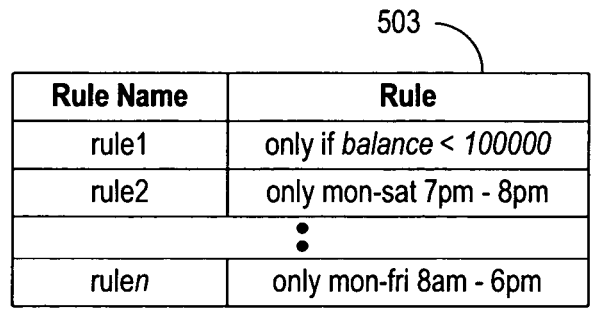

FIG. 5 depicts two additional tables for the exemplary organization of authorization information, in accordance with the illustrative embodiment of the present invention.

Content version table 502 indicates which version of content is accessible for particular user/content/neighbor combinations. For example, the third row of content version table 502 in FIG. 5 indicates that when user MajJSmith accesses content F16MaxSpeed, he gets the classified version when there are no other users nearby. As in the case of table 401, in some embodiments the contents of table 502 might be distributed and stored locally at wireless terminals 202. In such embodiments, wireless terminals 202 might "inherit" and "export" version information in a similar peer-to-peer fashion as command authorization information of table 401, as described above.

Rule list 503 contains necessary conditions for authorization of commands of table 401. For commands that access the value associated with a descriptor (e.g., the value associated with descriptor "balance" for a particular depositor, etc.), rule list 503 might contain rules that determine authorization based on the particular value stored (e.g., balance<100000, etc.), the descriptor itself, or both.

In some embodiments, the authorization information of FIGS. 4 and 5 might be stored centrally at a server and personal wireless terminal 202-i sends queries to the server to retrieve this information, while in some other embodiments, authorization information pertaining to a particular personal wireless terminal 202-i might be available locally at the terminal (e.g., stored in memory 303, etc.).

In some embodiments in which the information of authorization information of table 401 is distributed and stored locally at wireless terminals 202, as described above, authorization based on entries such as the sixth row might be determined via peer-to-peer communications between neighboring terminals. For example, when Gary Chen enters a command to read a biopsy result at his wireless terminal, and his supervisor Newman is nearby, Chen's terminal might send a message to Newman's terminal inquiring whether Newman is authorized to read a biopsy result. Newman's terminal might then send a message back to Chen's terminal that indicates whether Newman is authorized. As will be appreciated by those skilled in the art, in some embodiments Newman's terminal might have rules specifying who is allowed to query for authorization information in this manner (i.e., rules indicating to which terminals authorization can be "exported").

As will be appreciated by those skilled in the art, in some embodiments the authorization information in some or all of tables 401, 501, and 502 might be provided by a system administrator or by the users of wireless terminals 202, while in some other embodiments, this information might be extracted from a set of business rules. As will be further appreciated by those skilled in the art, in some embodiments the entries in some or all of tables 401, 501, and 502 might be static, while in some other embodiments, these entries might be dynamic based on an algorithm, a particular event, calendrical time, etc.

Figure 6:
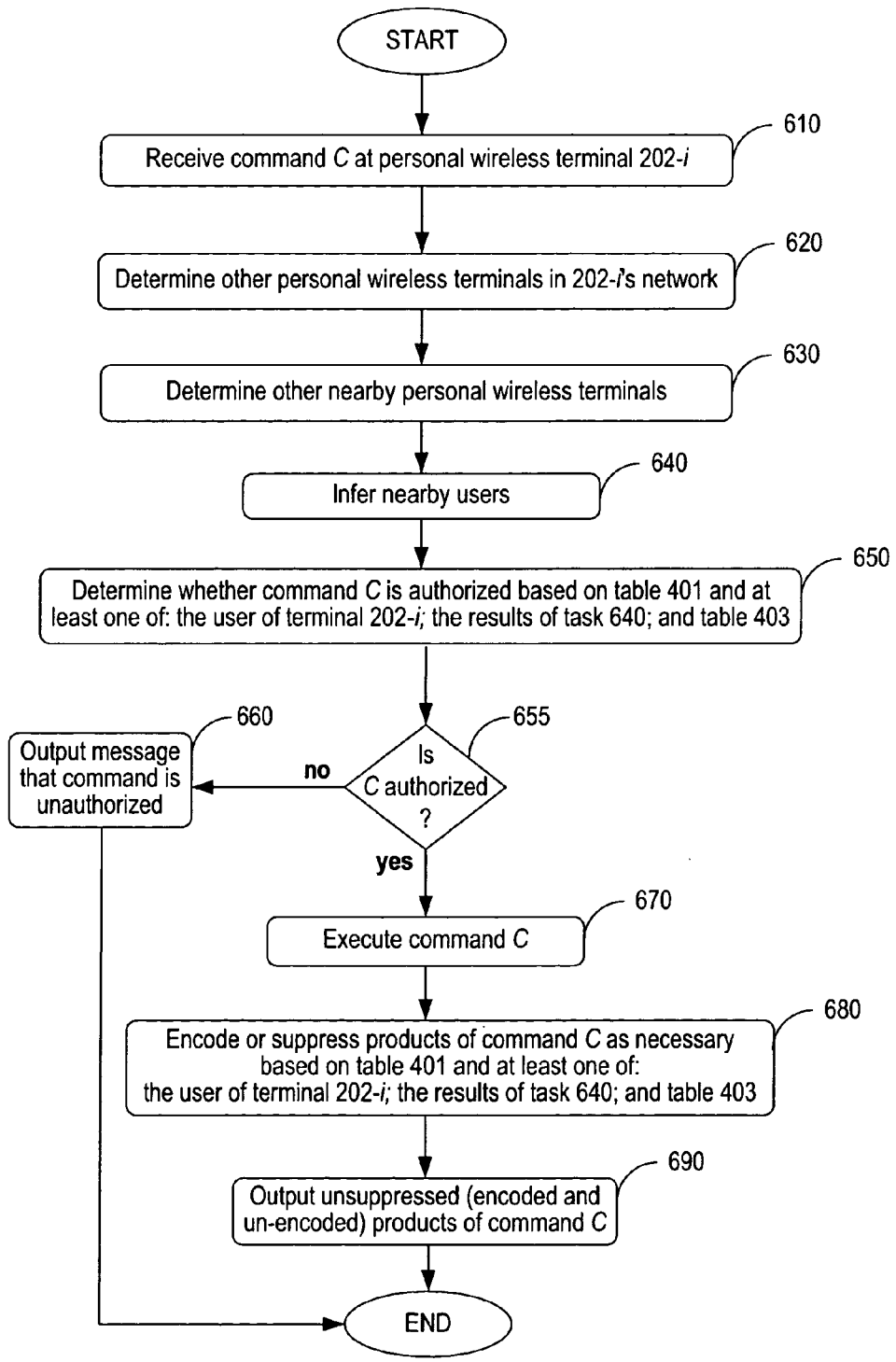
FIG. 6 depicts a flowchart of the operation of personal wireless terminal 202-$i$ in response to a user command, in accordance with the illustrative embodiment of the present invention.

FIG. 6 depicts a flowchart of the operation of personal wireless terminal 202-i in response to a user command, in accordance with the illustrative embodiment of the present invention. It will be clear to those skilled in the art which tasks depicted in FIG. 6 can be performed simultaneously or in a different order than that depicted.

At task 610, input/output interface 305 of personal wireless terminal 202-i receives command C from the user.

At task 620, processor 302 of personal wireless terminal 202-i determines what personal wireless terminals belong to personal wireless terminal 202-i's network (e.g., piconet, scatternet, etc.) in well-known fashion. In some embodiments, personal wireless terminal 202-i might be informed of the kinds of wireless terminals in its network (i.e., whether a terminal is a wireless computer mouse, a wireless computer keyboard, a personal wireless terminal, etc.) via the wireless communications protocol employed (e.g., Bluetooth, etc.), while in some other embodiments, personal wireless terminal 202-i might send messages to the wireless terminals in its network to request this information.

At task 630, processor 302 determines what other personal wireless terminals are nearby (i.e., are capable of communicating with personal wireless terminal 202-i). As described above, processor 302 might discover nearby wireless terminals outside of personal wireless terminal 202-i's network by listening to the shared-communications channel, broadcasting a message that requests an acknowledgement, etc.

At task 640, processor 302 infers which users are nearby based on the results of tasks 620 and 630, and on the users associated with the personal wireless terminals discovered by these tasks. In some embodiments, personal wireless terminal 202-i might be automatically informed of the users associated with personal wireless terminals via the wireless communications protocol employed (e.g., Bluetooth, etc.). In some other embodiments, personal wireless terminal 202-i might send messages to the personal wireless terminals to request this information.

As will be appreciated by those skilled in the art, in some embodiments in which wireless terminal 202-i might be available to a plurality of users, a user might identify himself or herself by initially logging in to the terminal, or by inserting a personalized Single In-line Memory Module (SIMM) card into a memory slot of wireless terminal 202-i, etc.

At task 650, processor 302 determines whether command C is authorized based on the contents of table 401 and on at least one of: the identity of the user of personal wireless terminal 202-i; the number of nearby users as inferred at task 640; the identity of nearby users as inferred at task 640; and, if necessary, the contents of table 503.

At task 655, processor 302 performs a branch based on whether command C is authorized. If the command is not authorized, execution continues at task 660, otherwise execution continues at task 670.

At task 660, processor 302 outputs a message indicating that command C is not authorized to input/output interface 305 for presentation to the user, in well-known fashion. After task 660, the method of FIG. 6 terminates.

At task 670, processor 302 executes command C, in well-known fashion.

At task 680, processor 302 suppresses or encodes outputs of command C as indicated in the "output" field of the appropriate entry in table 401. As in task 650, suppressing or encoding outputs of command C is based on at least one of: the identity of the user of personal wireless terminal 202-i; the number of nearby users as inferred at task 640; the identity of nearby users as inferred at task 640; and, if necessary, the contents of table 503.

At task 690, processor 302 outputs the unsuppressed outputs of command C (both encoded and un-encoded) to input/output interface 305 for presentation to the user, in well-known fashion. After task 690, the method of FIG. 6 terminates.

Figure 7:
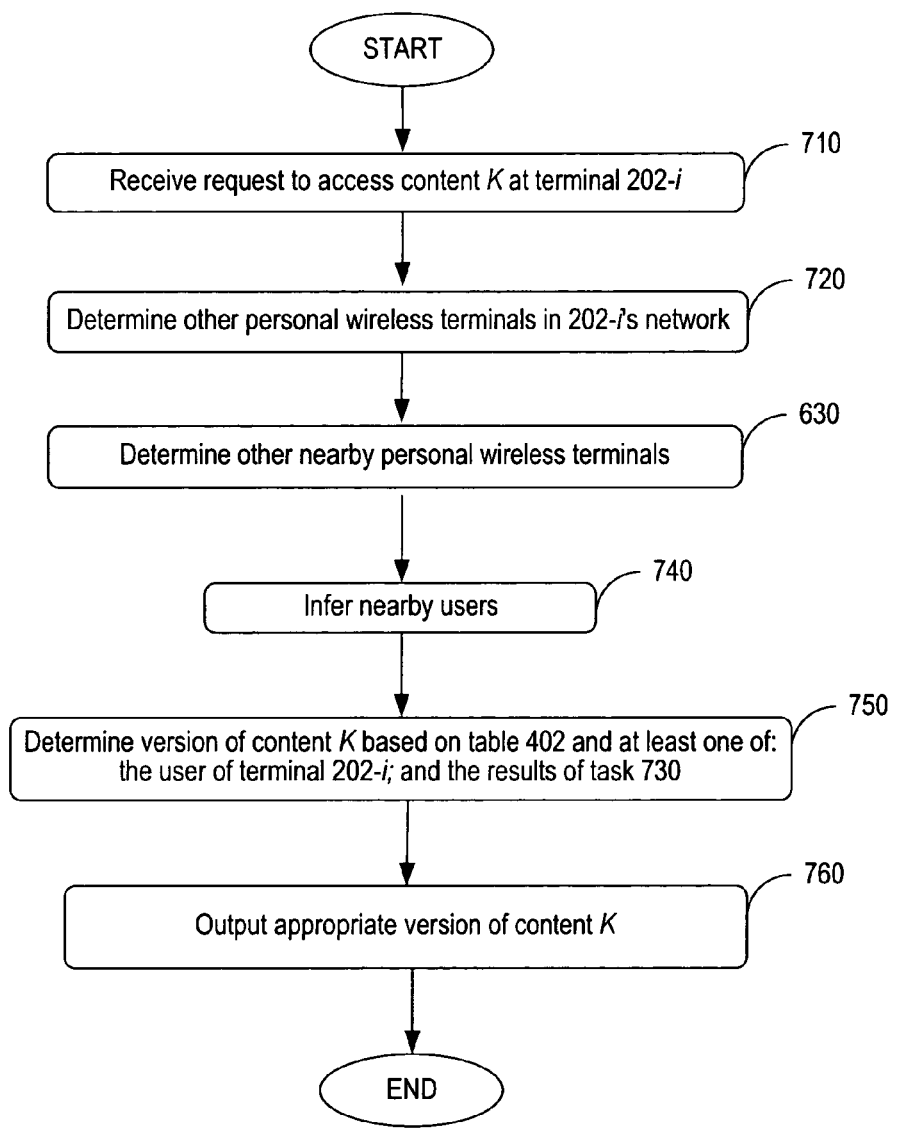
FIG. 7 depicts a flowchart of the operation of personal wireless terminal 202-$i$ in response to a user request to access content, in accordance with the illustrative embodiment of the present invention.

FIG. 7 depicts a flowchart of the operation of personal wireless terminal 202-i in response to a user request to access content, in accordance with the illustrative embodiment of the present invention. It will be clear to those skilled in the art which tasks depicted in FIG. 7 can be performed simultaneously or in a different order than that depicted.

At task 710, input/output interface 305 of personal wireless terminal 202-i receives a request from the user to access content K.

At task 720, processor 302 of personal wireless terminal 202-i determines what personal wireless terminals belong to personal wireless terminal 202-i's network (e.g., piconet, scatternet, etc.) in well-known fashion. In some embodiments, personal wireless terminal 202-i might be informed of the kinds of wireless terminals in its network (i.e., whether a terminal is a wireless computer mouse, a wireless computer keyboard, a personal wireless terminal, etc.) via the wireless communications protocol employed (e.g., Bluetooth, etc.). In some other embodiments, personal wireless terminal 202-i might send messages to the wireless terminals in its network to request this information.

At task 730, processor 302 determines what other personal wireless terminals are nearby (i.e., are capable of communicating with personal wireless terminal 202-i). As described above, processor 302 might discover nearby wireless terminals outside of personal wireless terminal 202-i's network by listening to the shared-communications channel, broadcasting a message that requests an acknowledgement, etc.

At task 740, processor 302 infers which users are nearby based on the results of tasks 720 and 730, and on the users associated with the personal wireless terminals discovered by these tasks. In some embodiments, personal wireless terminal 202-i might be automatically informed of the users associated with personal wireless terminals via the wireless communications protocol employed (e.g., Bluetooth, etc.), while in some other embodiments, personal wireless terminal 202-i might send messages to the personal wireless terminals to request this information.

As will be appreciated by those skilled in the art, in some embodiments in which wireless terminal 202-i might be available to a plurality of users, a user might identify himself or herself by initially logging in to the terminal, or by inserting a personalized Single In-line Memory Module (SIMM) card into a memory slot of wireless terminal 202-i, etc.

At task 750, processor 302 determines the version of content K based on the contents of table 502 and on at least one of: the identity of the user of personal wireless terminal 202-i; the number of nearby users as inferred at task 740; and the identity of nearby users as inferred at task 740.

At task 760, processor 302 retrieves the appropriate version of content K and sends the content to input/output interface 305 for presentation to the user, in well-known fashion. After task 760, the method of FIG. 7 terminates.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   (a) receiving by a first personal wireless terminal a request to access content; and
   (b) outputting by said first personal wireless terminal a first version of said content when there are at least k other personal wireless terminals in the same wireless network as said first personal wireless terminal, and
   outputting by said first personal wireless terminal a second version of said content when there are fewer than k other personal wireless terminals in the same wireless network as said first personal wireless terminal;
   wherein k is a positive integer.

2. The method of claim 1 wherein said first version of said content is associated with a first authorization category, and wherein said second version of said content is associated with a second authorization category.

3. The method of claim 1 wherein said first version of said content is associated with a first medium, and wherein said second version of said content is associated with a second medium.

4. The method of claim 1 wherein k=1.

5. The method of claim 1 wherein k>1.

6. A method comprising:
   (a) receiving by a first personal wireless terminal a request to access content;
   (b) selecting one of a plurality of versions of said content based on whether or not there is at least one other personal wireless terminal in the same wireless network as said first personal wireless terminal; and
   (c) outputting by said first personal wireless terminal the selected version of said content.

7. The method of claim 6 wherein the selection is also based on the identity of the user of said first personal wireless terminal.

8. The method of claim 6 wherein there is a second personal wireless terminal in the same wireless network as said first personal wireless terminal, and wherein the selection is also based on the identity of the user of said second personal wireless terminal.

9. The method of claim 6 wherein the selection is also based on the calendrical time at said first personal wireless terminal.

10. The method of claim 6 wherein there is a first version of said content that is associated with a first authorization category, and wherein there is a second version of said content that is associated with a second authorization category.

11. The method of claim 6 wherein there is a first version of said content that is associated with a first medium, and wherein there is a second version of said content that is associated with a second medium.

* * * * *